United States Patent [19]
Hwang

[11] Patent Number: 5,883,306
[45] Date of Patent: Mar. 16, 1999

[54] MULTI-PURPOSE TOOL WITH DISPLAY UNIT FOR SHOWING TIRE PRESSURE AND TIRE TREAD DEPTH THEREON

[76] Inventor: Raymond Hwang, No. 35, Sec. 4, Ting-Tsao Rd., Tsao-Chung Li, Lu-Kang Chen, Chang-Hua Hsien, Taiwan

[21] Appl. No.: 15,118

[22] Filed: Jan. 29, 1998

[51] Int. Cl.[6] .................................................. B60C 23/02
[52] U.S. Cl. ......................... 73/146.8; 73/146; 116/34 R
[58] Field of Search .................................. 73/146.8, 146; 116/34 R

[56] References Cited

U.S. PATENT DOCUMENTS

| | | | |
|---|---|---|---|
| 4,526,030 | 7/1985 | Vecera | 73/146.8 |
| 4,916,944 | 4/1990 | Ho-Chuan | 73/146.8 |
| 5,333,342 | 8/1994 | Huang . | |
| 5,339,683 | 8/1994 | Huang | 73/146.8 |

Primary Examiner—Joseph L. Felber
Attorney, Agent, or Firm—Harness, Dickey & Pierce, P.L.C.

[57] ABSTRACT

The main tool housing of a multi-purpose tool is provided with an adapter that is adapted for coupling with a tire air valve, a finger piece disposed in the adapter and adapted to open the tire air valve, and an air inlet formed in the finger piece to permit entry of air into the main tool housing. A tire tread depth measuring unit includes a measuring rod that extends movably into the main tool housing, and a position sensor for generating an electrical displacement signal corresponding to length of the measuring rod that is extended out of the main tool housing when the measuring rod is used to measure depth of a tire tread. A tire pressure measuring unit includes a pressure sensor disposed in the main tool housing adjacent to the finger piece. The pressure sensor generates an electrical pressure signal corresponding to pressure of the air that enters into the main tool housing via the air inlet. A processing unit calculates a measured tire tread depth based on the electrical displacement signal, and a measured tire pressure based on the electrical pressure signal. The processing unit controls a display unit on the main tool housing so as to show the measured tire tread depth and the measured tire pressure thereon.

14 Claims, 6 Drawing Sheets

MULTI-PURPOSE TOOL WITH DISPLAY UNIT FOR SHOWING TIRE PRESSURE AND TIRE TREAD DEPTH THEREON

BACKGROUND OF THE INVENTION

1. Field of the Invention

The invention relates to a tool for measuring tire pressure and tire tread depth, more particularly to a multi-purpose tool with a display unit for showing tire pressure and tire tread depth thereon.

2. Description of the Related Art

As a precautionary measure, frequent checking of the tire pressure and the tire tread depth must be performed in order to minimize the risk of accidents. A tire pressure gauge and a tire tread depth checker are thus indispensable tools for any driver. A torch is also necessary so that the checking operation can be done at night.

Generally, the various car tools are in the form of separate instruments which are inconvenient to use at the same time, which occupy a lot of storage space in a car, and which are easily misplaced.

In order to overcome the aforementioned drawbacks, a multi-purpose tool having snow scraping, tire pressure measuring, tire tread depth measuring and light generating capabilities has been proposed in U.S. Pat. No. 5,333,342. However, determination of the tire pressure and the tire tread depth are inconvenient to conduct since graduated measuring rods are relied upon in the multi-purpose tool for tire pressure and tire tread depth checking.

SUMMARY OF THE INVENTION

Therefore, the main object of the present invention is to provide a multi-purpose tool that incorporates a display unit for showing tire pressure and tire tread depth thereon, thereby facilitating the tire pressure and tire tread depth checking operations.

Another object of the present invention is to provide a multi-purpose tool that further incorporates an illuminating unit to aid checking of the tire pressure and the tire tread depth under poor surrounding light conditions.

Still another object of the present invention is to provide a multi-purpose tool that further incorporates an audible alarm unit to alert the user in the event that the measured tire tread depth is less than a predetermined depth and in the event that the measured tire pressure does not fall within a predetermined pressure range.

According to the present invention, a multi-purpose tool comprises a main tool housing, a tire tread depth measuring unit, a tire pressure measuring unit, a display unit, and a processing unit. The main tool housing is provided with an adapter that is adapted for coupling with a tire air valve, a finger piece disposed in the adapter and adapted to open the tire air valve, and an air inlet formed in the finger piece to permit entry of air into the main tool housing. The tire tread depth measuring unit includes a measuring rod that extends movably into the main tool housing, and a position sensor for generating an electrical displacement signal corresponding to length of the measuring rod that is extended out of the main tool housing when the measuring rod is used to measure depth of a tire tread. The tire pressure measuring unit includes a pressure sensor disposed in the main tool housing adjacent to the finger piece. The pressure sensor generates an electrical pressure signal corresponding to pressure of the air that enters into the main tool housing via the air inlet. The display unit is provided on the main tool housing. The processing unit is connected to the tire tread depth measuring unit, the tire pressure measuring unit and the display unit. The processing unit calculates a measured tire tread depth based on the electrical displacement signal, and further calculates a measured tire pressure based on the electrical pressure signal. The processing unit controls the display unit so as to show the measured tire tread depth and the measured tire pressure thereon.

Preferably, the multi-purpose tool further comprises an illuminating unit and an audible alarm unit. The illuminating unit is mounted on the main tool housing and is operable so as to generate light. The audible alarm unit is connected to the processing unit and is controlled by the latter so as to generate an audible alarm output when the measured tire tread depth is less than a predetermined depth and when the measured tire pressure does not fall within a predetermined pressure range.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
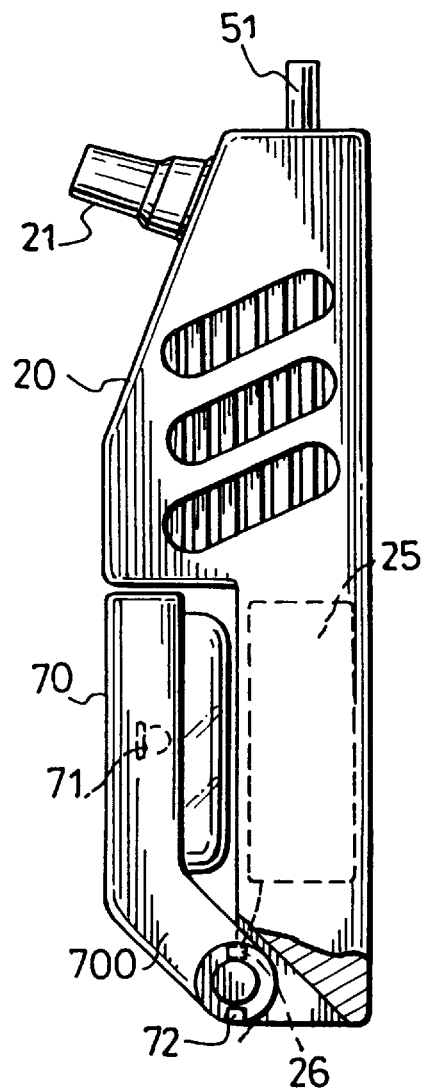
FIG. 1 is a schematic side view of the preferred embodiment of a multi-purpose tool according to the present invention.

Referring to FIGS. 1 to 7, the preferred embodiment of a multi-purpose tool according to the present invention is shown to comprise a main tool housing 20, a digital display unit 30, a processing unit 40, a tire tread depth measuring unit 50, a tire pressure measuring unit 60, an illuminating unit 70, and an audible alarm unit 80.

Figure 6:
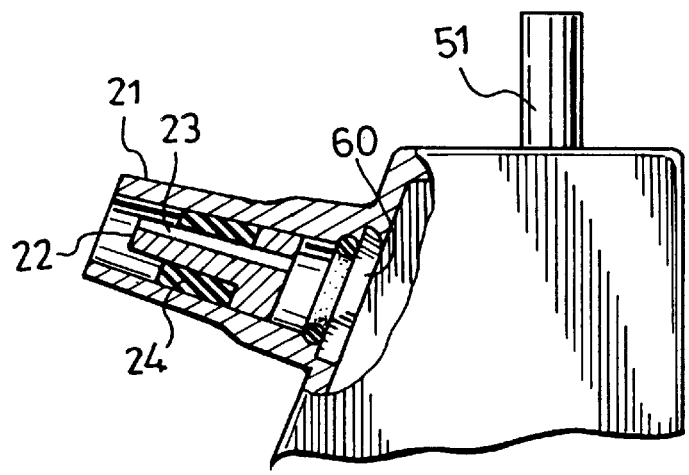
FIG. 6 is an enlarged partly sectional view illustrating a tire pressure measuring unit of the preferred embodiment.

The main tool housing 20 is provided with an adapter 21 for coupling with a tire air valve (not shown). As shown in FIG. 6, a finger piece 22 is disposed in the adapter 21 for opening the tire air valve. The finger piece 22 is formed with an air inlet 23 so that air in the tire can enter into the main tool housing 20 when the tire air valve is opened. A sealing ring 24 retains the finger piece 22 fittingly in the adapter 21.

Figure 3:
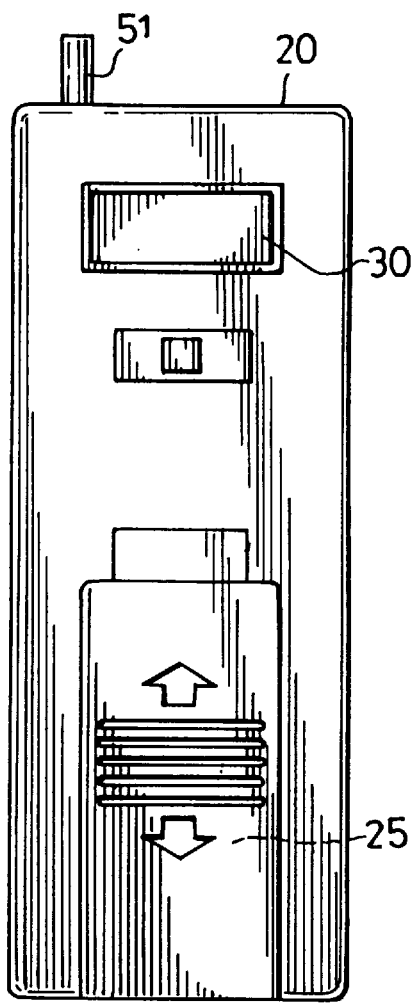
FIG. 3 is a schematic rear view of the preferred embodiment.

Referring to FIGS. 1 and 3, the rear side of the main tool housing 20 is formed with a receiving chamber for receiving a cell unit 25 therein. The lower end of the main tool housing 20 is provided with a set of stationary electrical contacts 26 that are connected electrically to the cell unit 25.

The digital display unit 30, such as a liquid crystal display, is provided on the rear side of the main tool housing 20, and is connected to the cell unit 25. The digital display unit 30 is used to show the measured tire pressure and the measured tire tread depth thereon, as will be described in greater detail in the succeeding paragraphs.

Figure 4:
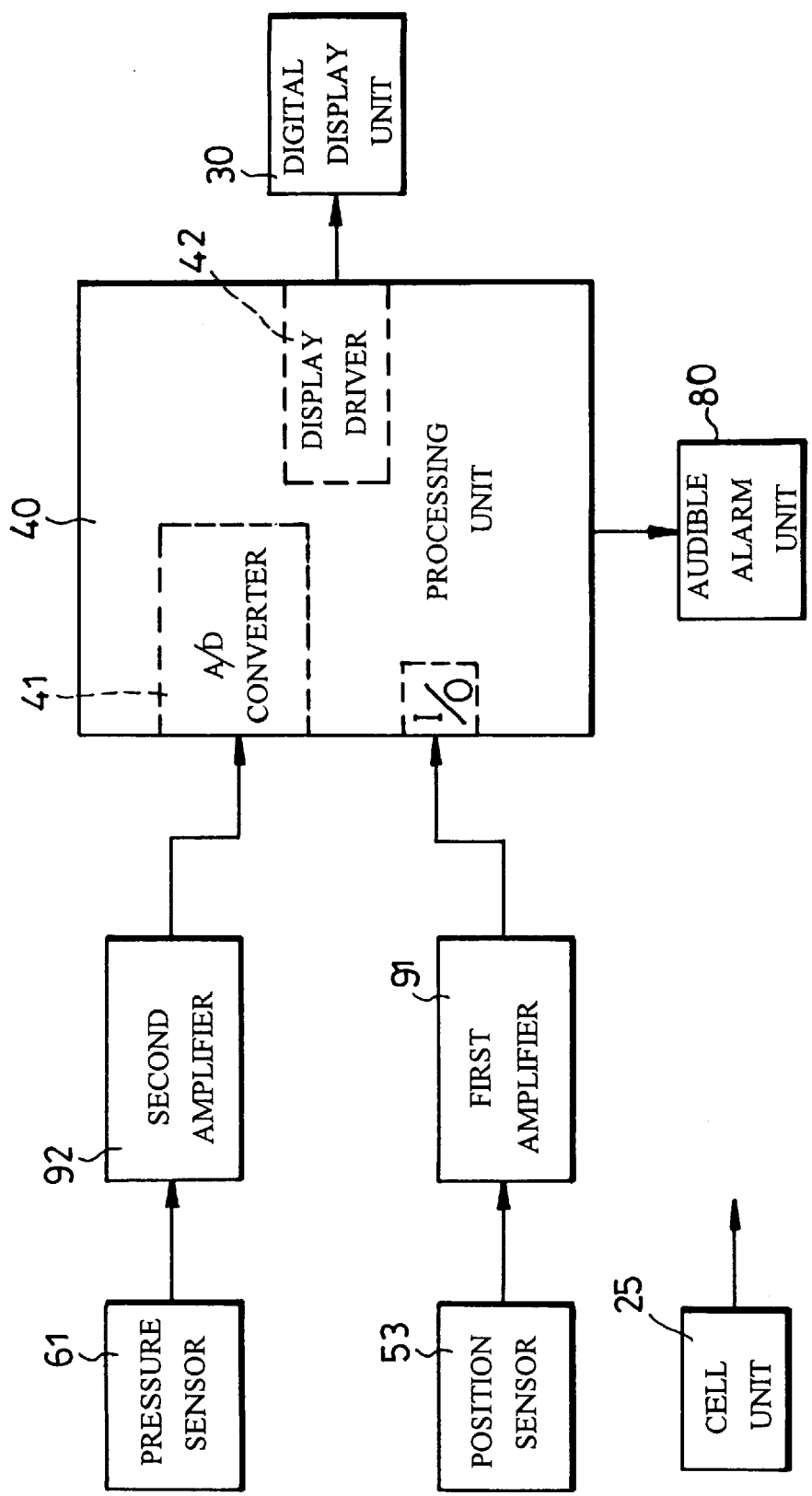
FIG. 4 is a schematic circuit block diagram of the preferred embodiment.
Figure 5:
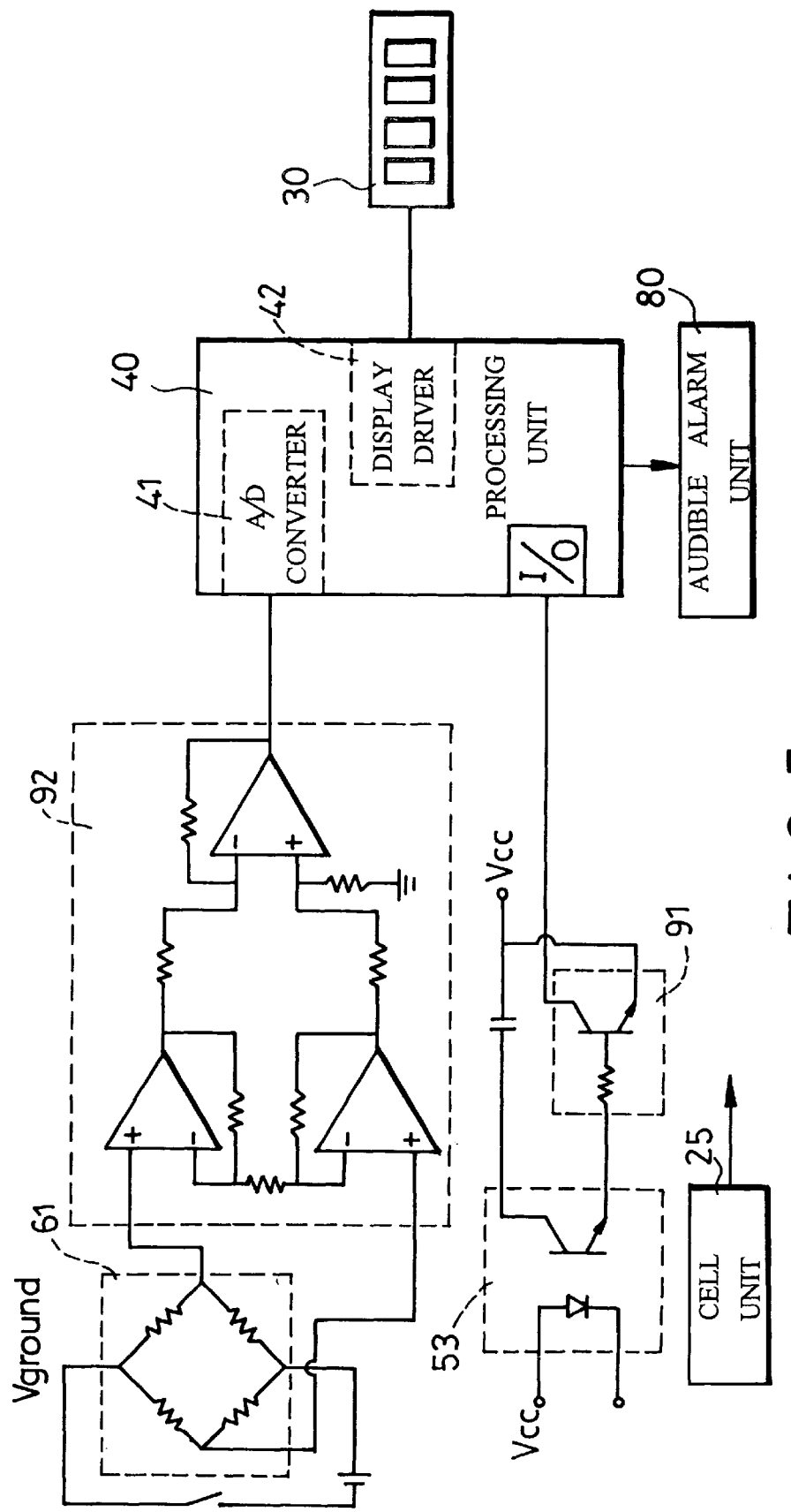
FIG. 5 is a schematic electrical circuit diagram of the preferred embodiment.

The processing unit 40 is disposed in the main tool housing 20 and includes an analog-to-digital (A/D) converter 41 and a display driver 42 (see FIGS. 4 and 5). The display driver 42 is connected to the digital display unit 30 and is used to drive the same in a conventional manner. The processing unit 40 is connected to the cell unit 25 so that operating power can be supplied to the same.

Figure 7:
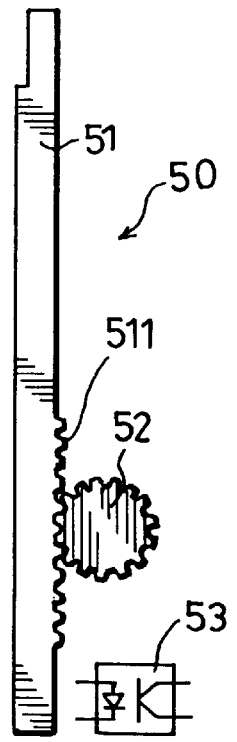
FIG. 7 is a schematic view illustrating a tire tread depth measuring unit of the preferred embodiment.

Referring to FIGS. 1 and 7, the tire tread depth measuring unit 50 includes a measuring rod 51, a sprocket 52 and a position sensor 53. The measuring rod 51 has a lower end portion that extends movably into the main tool housing 20 at an upper end of the latter and that is formed with a rack segment 511. The sprocket 52 is disposed rotatably in the main tool housing 20 and meshes with the rack segment 511. When the measuring rod 51 is extended out of the main tool housing 20 and into a tire tread (not shown) until the tip of the measuring rod 51 touches the tire surface, the sprocket 52 is driven to rotate by the rack segment 511 by an angle corresponding to the length of the measuring rod 51 that is extended out of the main tool housing 20, indicative of the depth of the tire tread. The position sensor 53, which is connected to the cell unit 25 so that operating power is supplied thereto, detects the angular movement of the sprocket 52 and generates an electrical displacement signal corresponding thereto. In this embodiment, the position sensor 53 is a known optoelectronic sensor disposed adjacent to the sprocket 52. The electrical displacement signal that is generated by the position sensor 53 is in the form of pulse signals corresponding to the detected angular movement of the sprocket 52 in terms of the sprocket teeth. As shown in FIGS. 4 and 5, the position sensor 53 is connected to the processing unit 40 via a first amplifier 91 so that the pulse signals from the position sensor 53 are amplified before being provided to the processing unit 40. Based on the pulse signals received thereby, the processing unit 40 is able to calculate the tire tread depth. The processing unit 40 then controls the digital display unit 30 so as to show the measured tire tread depth thereon.

Referring again to FIG. 4, 5 and 6, the tire pressure measuring unit 60 is disposed in the main tool housing 20 and includes a pressure sensor 61 that is connected to the cell unit 25 so that operating power can be supplied thereto. In this embodiment, the pressure sensor 61 is a known piezoresistive sensor and is disposed adjacent to the finger piece 22. The pressure sensor 61 generates an electrical pressure signal corresponding to the pressure of air that enters into the main tool housing 20 via the air inlet 23. The pressure sensor 61 is connected to the A/D converter 41 of the processing unit 40 via a second amplifier 92 so that the electrical pressure signal is amplified before the A/D converter 41 converts the same into a corresponding digital pressure signal. The processing unit 40 calculates the tire pressure from the digital pressure signal, and controls the digital display unit 30 so as to show the measured tire pressure thereon.

Figure 2:
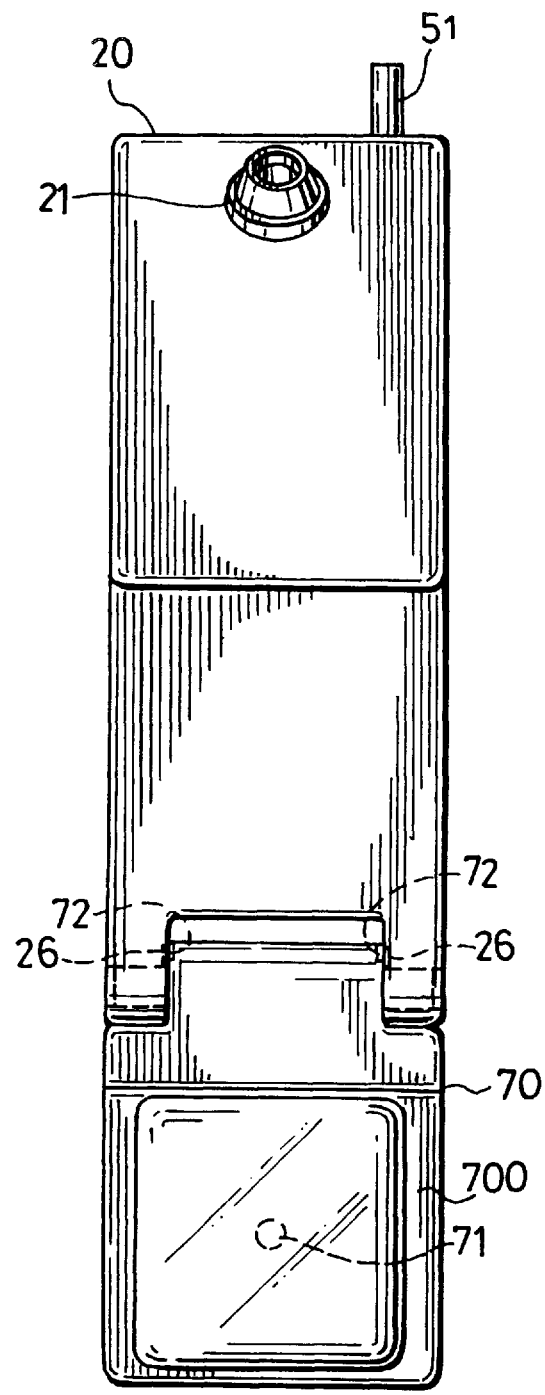
FIG. 2 is a schematic front view of the preferred embodiment.

Referring to FIGS. 1 and 2, the illuminating unit 70 includes a bulb holder 700 pivoted to the lower end of the main tool housing 20. A light bulb 71 is mounted on a front side of the bulb holder 700. The bulb holder 700 is further provided with a set of movable electrical contacts 72 that are connected electrically to the light bulb 71. The bulb holder 700 is movable between a folded position, where the light bulb 71 faces the front side of the main tool housing 20 and the movable electrical contacts 72 are not in electrical contact with the stationary electrical contacts 26 so as to break electrical connection between the light bulb 71 and the cell unit 25 in order to deactivate the light bulb 71, as shown in FIG. 1, and an unfolded position, where the light bulb 71 is moved away from the main tool housing 20 and the movable electrical contacts 72 are in electrical contact with the stationary electrical contacts 26 so as to make electrical connection between the light bulb 71 and the cell unit 25 in order to activate the light bulb 71, as shown in FIG. 2.

Referring again to FIGS. 4 and 5, the audible alarm unit 80 is connected to the processing unit 40 and is controlled by the latter so as to generate an audible alarm output for informing the user when the measured tire tread depth is less than a predetermined depth and when the measured tire pressure does not fall within a predetermined pressure range, i.e. an insufficient or an excessive tire pressure condition exists.

It has thus been shown that the multi-purpose tool of this invention facilitates accurate tire pressure and tire tread depth checking since the measured tire pressure and the measured tire tread depth are shown on the digital display unit 30. In addition, due to the presence of the illuminating unit, checking of the tire pressure and the tire tread depth can be performed even under poor surrounding light conditions. Moreover, the inclusion of the audible alarm unit 80 ensures that the user is alerted in the event that the measured tire tread depth is less than the predetermined depth and in the event that the measured tire pressure does not fall within the predetermined pressure range. The objects of the present invention are thus met.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A multi-purpose tool, comprising:

a main tool housing provided with an adapter that is adapted for coupling with a tire air valve, a finger piece disposed in said adapter and adapted to open the tire air valve, and an air inlet formed in said finger piece to permit entry of air into said main tool housing;

a tire tread depth measuring unit including a measuring rod that extends movably into said main tool housing, and a position sensor for generating an electrical displacement signal corresponding to length of said measuring rod that is extended out of said main tool housing when said measuring rod is used to measure depth of a tire tread;

a tire pressure measuring unit including a pressure sensor disposed in said main tool housing adjacent to said finger piece, said pressure sensor generating an electrical pressure signal corresponding to pressure of the air that enters into said main tool housing via said air inlet;

a display unit provided on said main tool housing; and a processing unit connected to said tire tread depth measuring unit, said tire pressure measuring unit and said display unit, said processing unit calculating a measured tire tread depth based on the electrical displacement signal and further calculating a measured tire pressure based on the electrical pressure signal, said processing unit controlling said display unit so as to show the measured tire tread depth and the measured tire pressure thereon.

2. The multi-purpose tool as claimed in claim 1, wherein said measuring rod has an end portion that extends into said main tool housing and that is formed with a rack segment, said tire tread depth measuring unit further including a sprocket that is disposed rotatably in said main tool housing and that meshes with said rack segment, said sprocket being driven by said rack segment to rotate by an angle corresponding to the length of said measuring rod that is extended out of said main tool housing.

3. The multi-purpose tool as claimed in claim 2, wherein said position sensor is disposed adjacent to said sprocket to detect angular movement thereof, the electrical displacement signal being in the form of pulse signals corresponding to the angular movement of said sprocket.

4. The multi-purpose tool as claimed in claim 3, further comprising an amplifier which interconnects said position sensor and said processing unit.

5. The multi-purpose tool as claimed in claim 3, wherein said position sensor is an optoelectronic sensor.

6. The multi-purpose tool as claimed in claim 1, further comprising an amplifier which interconnects said pressure sensor and said processing unit.

7. The multi-purpose tool as claimed in claim 1, wherein said pressure sensor is a piezoresistine sensor.

8. The multi-purpose tool as claimed in claim 1, wherein said display unit is a digital liquid crystal display.

9. The multi-purpose tool as claimed in claim 8, wherein said processing unit includes an analog-to-digital converter for converting the electrical pressure signal into a digital pressure signal, and a display driver for driving said display unit.

10. The multi-purpose tool as claimed in claim 1, wherein said main tool housing is further provided with a receiving chamber for receiving a cell unit therein, said cell unit being connected to said position sensor, said pressure sensor, said display unit and said processing unit for supplying operating power thereto.

11. The multi-purpose tool as claimed in claim 10, further comprising an illuminating unit mounted on said main tool housing and connectable to said cell unit so as to generate light.

12. The multi-purpose tool as claimed in claim 11, wherein said illuminating unit includes a bulb holder pivoted to said main tool housing, and a light bulb mounted on said bulb holder.

13. The multi-purpose tool as claimed in claim 12, wherein said main tool housing is provided with a set of stationary electrical contacts that are connected to said cell unit, said bulb holder being provided with a set of movable electrical contacts that are connected to said light bulb, said bulb holder being movable between a folded position, where said light bulb faces said main tool housing and said movable electrical contacts are not in electrical contact with said stationary electrical contacts so as to break electrical connection between said light bulb and said cell unit in order to deactivate said light bulb, and an unfolded position, where said light bulb is moved away from said main tool housing and said movable electrical contacts are in electrical contact with said stationary electrical contacts so as to make electrical connection between said light bulb and said cell unit in order to activate said light bulb.

14. The multi-purpose tool as claimed in claim 1, further comprising an audible alarm unit connected to said processing unit and controlled by said processing unit so as to generate an audible alarm output when the measured tire tread depth is less than a predetermined depth and when the measured tire pressure does not fall within a predetermined pressure range.

* * * * *